US005339938A

United States Patent [19]

Patin

[11] Patent Number: 5,339,938

[45] Date of Patent: Aug. 23, 1994

[54] VARIABLE-SPEED CONVEYOR ELEMENT, PARTICULARLY FOR ACCELERATED TRANSPORTERS

[76] Inventor: Pierre Patin, 15, rue Buffon, 75005 Paris, France

[21] Appl. No.: 79,280

[22] Filed: Jun. 21, 1993

[30] Foreign Application Priority Data

Jun. 24, 1992 [FR] France ................................ 92 07709

[51] Int. Cl.[5] ................................ B65G 23/00

[52] U.S. Cl. ................................ 198/334; 198/792; 198/850

[58] Field of Search ............... 198/334, 337, 792, 850, 198/851, 853

[56] References Cited

U.S. PATENT DOCUMENTS

| | | | |
|---|---|---|---|
| 2,584,134 | 2/1952 | Knutson | 198/851 |
| 3,884,152 | 5/1975 | Emeriat | 198/334 |
| 4,053,044 | 10/1977 | Patin | 198/334 |
| 4,267,922 | 5/1981 | Patin et al. | 198/334 |

FOREIGN PATENT DOCUMENTS

| | | |
|---|---|---|
| 0007264 | 1/1980 | European Pat. Off. . |
| 2077171 | 10/1971 | France . |
| 2207069 | 6/1974 | France . |
| 2274523 | 1/1976 | France . |

*Primary Examiner*—Joseph E. Valenza
*Attorney, Agent, or Firm*—Pollock, Vande Sande & Priddy

[57] ABSTRACT

The variable-speed conveyor element applied to a handrail is made up of individual handles linked together by elements of variable length which themselves function like elements of the handrail. Each of these variable-length elements is formed from a continuous flexible link, such as a belt or cable, to which are fitted contiguous blocks which stop or limit the bending of the elements in one direction. The blocks have projections and recesses allowing them to mutually interlock and ensure the transmission of forces.

5 Claims, 3 Drawing Sheets

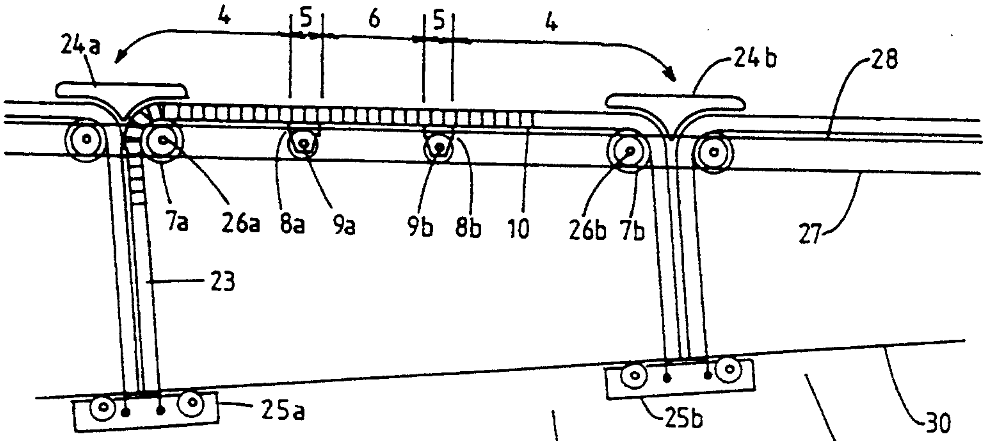
– Fig. 3 –
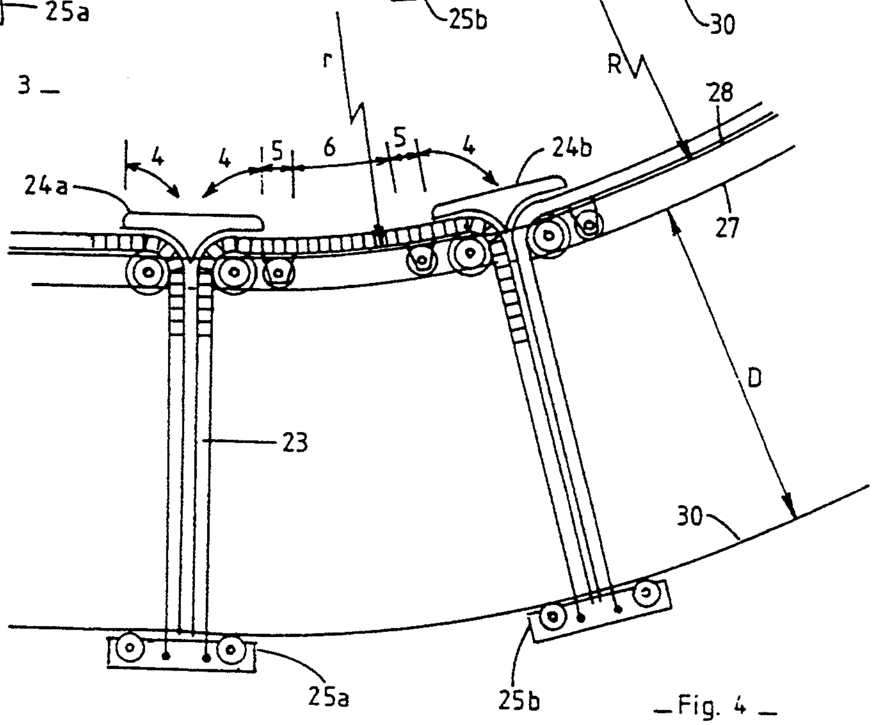
–Fig. 4 –

VARIABLE-SPEED CONVEYOR ELEMENT, PARTICULARLY FOR ACCELERATED TRANSPORTERS

BACKGROUND OF THE INVENTION

1. Field of the Invention

In certain cases of mechanical conveyors, particularly accelerated transporters, elements are required, particularly for the handrails, that bend in one direction only, at least in certain zones.

2. Prior Art

The prior art consisted in using chains fitted with locks which oppose the bending. The current state of the art is represented by French patent Nos. 2 274 523 and 2 431 075.

The handrail which is the object of these patents is intended for an accelerated transporter made up of handles linked together in twos by a flexible link. Each handle must be synchronous with the corresponding point of the moving floor, and consequently, the handles must separate from each other in acceleration zones, come closer together in deceleration zones and remain equidistant in constant speed zones. This result is obtained by mounting each handle on a small carriage. Two successive carriages are connected by a flexible link which can bend in only one direction and which provides a hand rest area between two handles. The flexible link element is folded, at right angles to the handle, around a pulley and is secured to a tightening carriage or runner whose track can come closer to or move away from that of the carriage to which the handle is fitted, thus making it possible to ensure the change in speed.

According to these patents, the flexible element is made up of a chain furnished with blocks whose complex shape is designed so that the link element, working as a simply supported beam, i.e., subject to a bending moment and a shearing force, does not deform when brought under load; the flexible element between two handrail handles may itself be used as a handrail in the event of "jostling," for example. The main drawback of this system is its complexity, which generates a relatively high cost.

In the device according to the invention, the flexible element is made up of a continuous flexible link of constant cross-section, such as a belt, cable, or set of belts or cables, which have the characteristic, unlike chains, of offering resistance to the shearing forces, and which are associated with compression blocks of simple form which fit into each other. The application of such a device to a handrail will now be described below by way of example. Similar devices could, however, be used in other conveyor elements for people or goods.

SUMMARY OF THE INVENTION

This invention relates to a handrail element, linking two handles, made up of a flexible link stretched between two attachment points and which passes around two guide pulleys spaced apart from each other and which together with the two attachment points form a quadrilateral that deforms according to the speed of conveyance. The link is equipped with a series of adjacent blocks each comprising a lower face for fixing the block onto the link, an upper face on which hands can rest and two frontal faces, respectively front and rear, perpendicular to the direction of the link. The frontal faces of a block in a rectilinear section of the link stretched between the two pulleys are in contact over their entire height with the corresponding frontal faces of the adjacent blocks, and are able to separate in angular fashion between the two convex sections of the link turning around the pulleys. The two frontal faces, respectively front and rear of each block, have angular profiles deduced one from the other by translation parallel to the direction of the link. Each front face of a block comprises at least one projection and each rear face at least one recess complementary to the projection, such that in the rectilinear section of the link between the two pulleys, each projection on a front face of a block fits into a complementary recess in the facing rear face of the adjacent block so as to form a mortise and tenon joint that is able to resist the shearing forces applied on the link, the projections separating from the recesses in the convex sections of the link.

The flexible link is preferably constituted by a notched belt.

BRIEF DESCRIPTION OF THE DRAWINGS

The construction and operation of such a handrail is illustrated in FIGS. 1 to 4.

FIGS. 3 and 4 show the use of such a handrail in an accelerated travelator.

DESCRIPTION OF THE PREFERRED EMBODIMENTS

Figure 1:
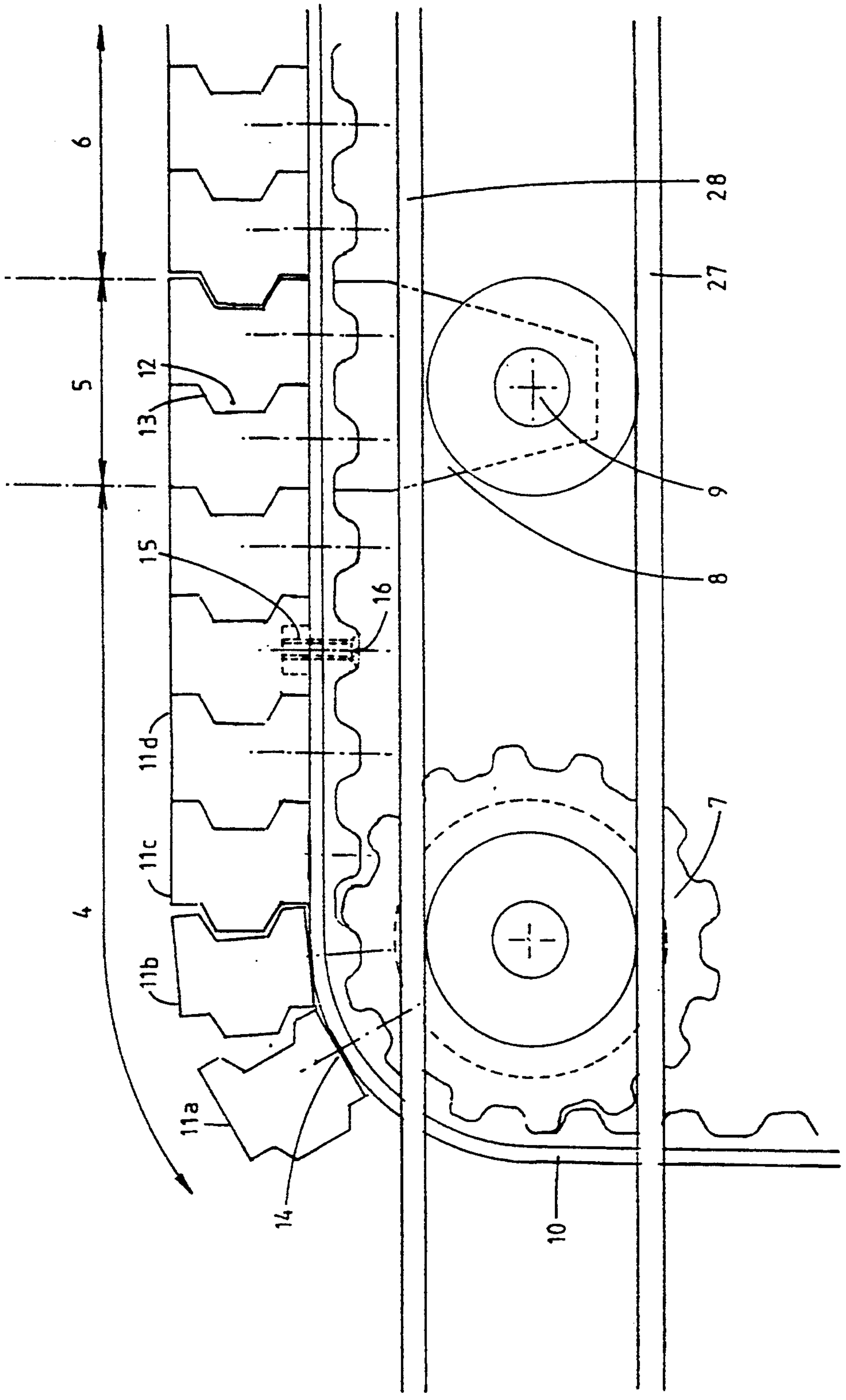
FIG. 1 shows a longitudinal cross-section of such a handrail that in one zone may be only downwardly folded with a small radius, but in another zone may also be upwardly folded through a much larger radius.
Figure 2:
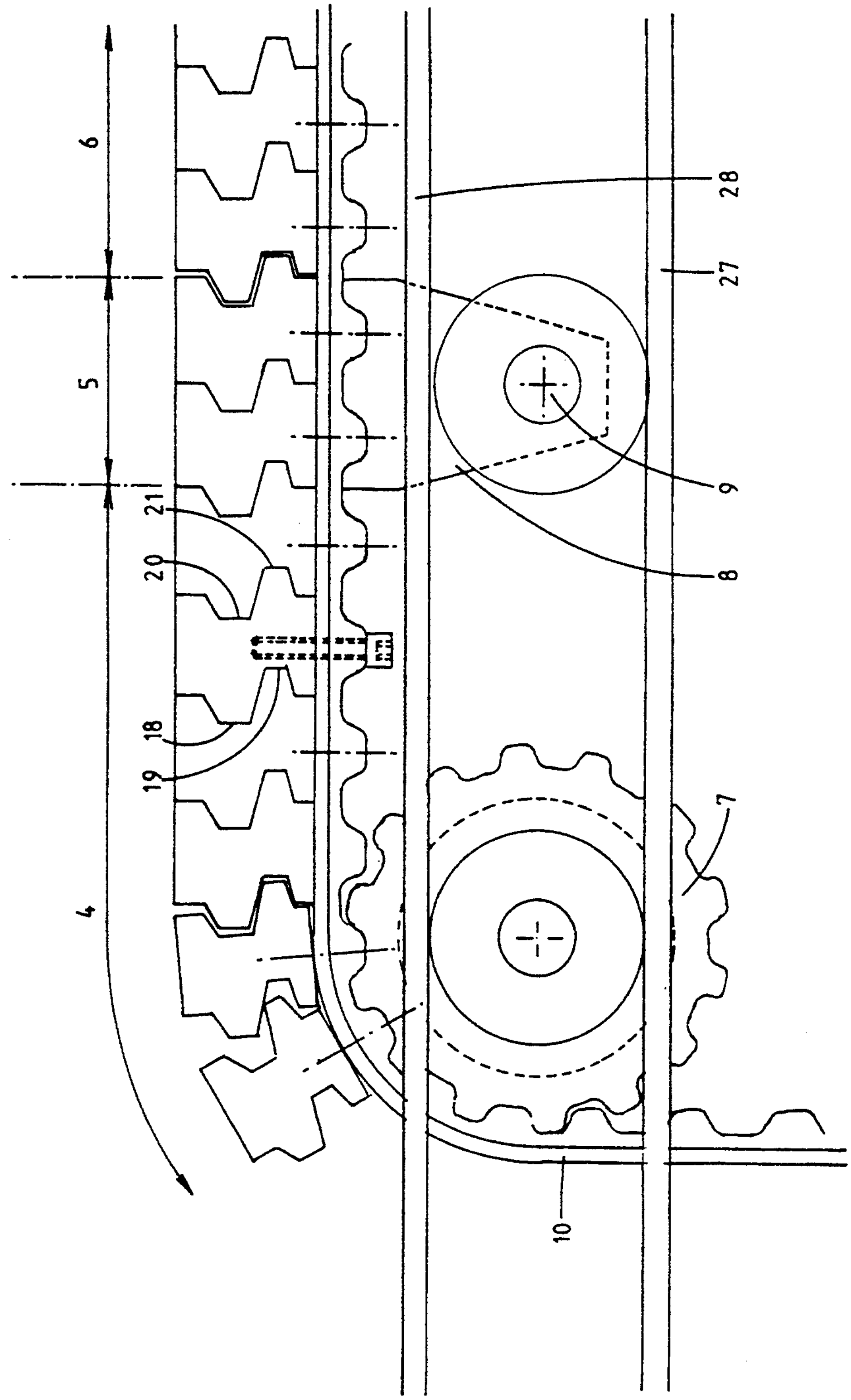
FIG. 2 shows an alternative embodiment.

FIG. 1 shows a handrail element in which:

- zone 4 can curve downwardly in a certain zone with a radius in the order of a few centimeters.
- zone 5 is rigid and integral with a small carriage supported by an axle 9,
- zone 6 can curve upwardly with a radius in the order of a meter.
- The handrail is made up of a notched belt 10 to which are fixed blocks 11 whose shape allows reciprocal interlocking between two contiguous blocks thanks to a projection 12 which fits into a recess 13. The block is fixed to the back of the belt either by bonding 14, as for blocks 11*a*, 11*b*, or by bolting 16 on an insert 15, as for the blocks 11*c*, 11*d*. This fixing is always performed at right angles to a notch which is the position of maximum rigidity of the belt, the belt mainly bending in the gap between notches. The thickness of a block at any point measured parallel to the back of the belt is constant and equal to the pitch of the teeth.

Such a system operates in the following way. All loading of the handrail, which works like a simply supported beam, introduces a bending moment and a shearing force. The longitudinal compression due to the moment is taken up by the heads of the blocks, and the tension by the handrail. The shearing force is transmitted from one block to another by the projection-recess couple and the resultant shearing at the block-belt interface is taken up by bonding 14 and bolting 16.

In rigid zone 5, the inner face of the belt is fixed to carriage 8 also by gluing or bolting.

To allow the handrail to bend upwardly, the thickness of blocks 11 in zone 6 decreases slightly, and regularly, from the bottom towards the top, the blocks being fixed in the same way as those in the other zones. FIG.

2 shows a different arrangement in which the system has been provided with a certain operating symmetry which can offer certain advantages. Each block 17 comprises on each face perpendicular to the axis of the notched belt 10, first, a projection 18 and a recess 19, and secondly, a recess 20 and a projection 21 facing projection 18 and recess 19. The device functions in a similar way to the preceding device. Different shapes could be use within the scope of the invention.

FIGS. 3 and 4 show the use of such a handrail in an accelerated transporter. Two handrail handles 24*a*, 24*b* are connected together by a handrail element 23 passing over guide pinions 7*a*, 7*b* and anchored to speed-variation trolleys 25*a*, 25*b*. Handles 24*a*, 24*b* have rollers carried by spindles 26*a*, 26*b* of pinions 7*a*, 7*b*. Axles 9*a*, 9*b* of carriages 8*a*, 8*b* have similar rollers which, like all the other rollers, move between two rails 27 and 28.

Speed variation trolleys 25*a*, 25*b* to which the ends of the belts are anchored are maintained by a rail 30 at a variable distance D from rails 27 and 28, which makes it possible to vary the spacing of the handles and consequently their speed, the rate in number of handles per second being constant.

Fig, 3 shows an overall view of an element in an accelerated transporter zone with a horizontal handrail in a speed acceleration zone.

FIG. 4 shows this same assembly in a zone where the handrail passes from a horizontal section to a sloping section. The curve is taken in zone 6, whose radius of curvature r is of course much shorter than the connecting radius of curvature R, low speed zones 4 and 5 remaining rectilinear.

What is claimed:

1. A variable-length conveyor element applicable to a handrail for a device for transporting people at variable speed, said conveyor element comprising:

(a) a flexible link stretched between two attachment points and passing around two guide pulleys spaced apart from each other which, together with the two attachment points, form a quadrilateral that deforms as a function of a speed of conveyance;

(b) said link being equipped with a series of adjacent blocks, each comprising a lower face for fixing the block onto said link, an upper face on which hands can rest, and two frontal faces, respectively front and rear, perpendicular to a direction of said link;

(c) said frontal faces of a block in a rectilinear section of said link stretched between said two pulleys being in contact over their entire height with corresponding frontal faces of adjacent blocks;

(d) said blocks in convex sections of said link turning on the pulleys being adapted to separate in angular fashion;

(e) said two frontal faces, respectively front and rear, of each block having angular profiles deduced one from the other by translation parallel to said direction of said link, each front face of a block comprising at least one projection, and each rear face comprising at least one recess having a profile complementary to a profile of said projection, such that in the rectilinear section of said link between said two pulleys, each projection on a front face of a block fits into a complementary recess in a facing rear face of an adjacent block so as to form a mortise and tenon joint that is able to resist shearing forces applied on said link, said projections separating from said recesses in convex sections of said link.

2. The conveyor element of claim 1, wherein each projection has upper and lower bearing faces which converge towards an outside of the block, each recess having lower and upper bearing faces diverging toward the outside, so as to allow a said projection to progressively engage in a said recess during a transition from a convex section to a rectilinear section of said link, and inversely.

3. The conveyor element of claim 1, wherein said two front faces of each block each have a projection and a recess.

4. The conveyor element of claim 1, wherein said flexible link is a notched belt having an inner face comprising projections separated by recesses, said blocks being fixed onto an outer face of said notched belt in such a way that a joining plane between bases of two adjacent blocks corresponds to a recess section of said flexible link.

5. The conveyor element of claim 1, wherein, by deformation of said quadrilateral according to a speed of conveyance, said two guide pulleys become separated on either side of two supporting rollers spaced at a constant distance, the rectilinear section of said link comprising a central zone of fixed length between two supporting rollers, and two lateral zones of variable length each extending between a supporting roller and the corresponding guide pulley, a length of an upper face of each block in the central fixed length zone being slightly less than a length of the lower face by which the block is fixed to the link, such that the handrail has a slight upwardly concavity between the two supporting rollers.

* * * * *